United States Patent
Awada et al.

(10) Patent No.: US 7,096,254 B2
(45) Date of Patent: Aug. 22, 2006

(54) ELECTRONIC MAIL DISTRIBUTION NETWORK IMPLEMENTATION FOR SAFEGUARDING SENDER'S ADDRESS BOOK COVERING ADDRESSEE ALIASES WITH MINIMUM INTERFERENCE WITH NORMAL ELECTRONIC MAIL TRANSMISSION

(75) Inventors: Faisal M. Awada, Round Rock, TX (US); Joe Nathan Brown, Austin, TX (US); Philip Bernard Burkes, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 10/159,483

(22) Filed: May 30, 2002

(65) Prior Publication Data

US 2003/0233409 A1    Dec. 18, 2003

(51) Int. Cl.
*G06F 15/16* (2006.01)
(52) U.S. Cl. ............ 709/206; 709/207; 709/229; 713/154; 713/153
(58) Field of Classification Search ............ 709/204, 709/206, 229, 207; 713/153, 154
See application file for complete search history.

(56) References Cited

U.S. PATENT DOCUMENTS

| | | | | |
|---|---|---|---|---|
| 6,009,177 A * | 12/1999 | Sudia | ............ | 713/191 |
| 6,385,655 B1 * | 5/2002 | Smith et al. | ............ | 709/232 |
| 6,584,564 B1 * | 6/2003 | Olkin et al. | ............ | 713/152 |
| 6,591,291 B1 * | 7/2003 | Gabber et al. | ............ | 709/206 |
| 6,640,301 B1 * | 10/2003 | Ng | ............ | 713/156 |
| 6,647,384 B1 * | 11/2003 | Gilmour | ............ | 707/5 |
| 6,671,718 B1 * | 12/2003 | Meister et al. | ............ | 709/206 |
| 6,675,153 B1 * | 1/2004 | Cook et al. | ............ | 705/74 |
| 6,708,205 B1 * | 3/2004 | Sheldon et al. | ............ | 709/206 |
| 6,760,752 B1 * | 7/2004 | Liu et al. | ............ | 709/206 |
| 6,993,563 B1 * | 1/2006 | Lytle et al. | ............ | 709/206 |
| 7,007,068 B1 * | 2/2006 | Morkel | ............ | 709/206 |
| 2003/0078978 A1 * | 4/2003 | Lardin et al. | ............ | 709/206 |
| 2003/0084331 A1 * | 5/2003 | Dixon et al. | ............ | 713/200 |

\* cited by examiner

*Primary Examiner*—Saleh Najjar
*Assistant Examiner*—Faruk Hamza
(74) *Attorney, Agent, or Firm*—Jerry B. Kraft; Mark E. McBurney (57) ABSTRACT

The E-mail sender's address book is safeguarded from computer virus intrusion with only minimal interference with normal E-mail distribution from the sender. Complete encryption of the address book create interference with the send function in that before any E-mail function may be started, the address book must be accessed and decrypted even when the E-mail being sent does involve the address book. However, the address book may be safeguarded from the computer virus with minimum E-mail interference if only a part of the address book is encrypted. There is stored the unencrypted data representative of a plurality of aliases for plurality of addressees of electronic mail, and separately stored encrypted data representative of the electronic mail addresses of said plurality of addressees. In response to a request to send electronic mail to one of said aliases, the entry of the key to decrypt the encrypted data is required to thereby provide the address of the addressee having said alias. If no alias is entered, i.e. the full address is entered, then the E-mail is sent without requiring a key entry by the sender.

24 Claims, 7 Drawing Sheets

ELECTRONIC MAIL DISTRIBUTION NETWORK IMPLEMENTATION FOR SAFEGUARDING SENDER'S ADDRESS BOOK COVERING ADDRESSEE ALIASES WITH MINIMUM INTERFERENCE WITH NORMAL ELECTRONIC MAIL TRANSMISSION

TECHNICAL FIELD

The present invention relates to electronic mail (E-mail) messages transmitted over communication networks such as the World Wide Web (Web) to display terminals, and particularly to the protection of E-mail sender's address books for storing the aliases for frequent sender addressees.

BACKGROUND OF THE RELATED ART

The past decade has been marked by a technological revolution driven by the convergence of the data processing industry with the consumer electronics industry. The effect has, in turn, driven technologies that have been known and available but relatively quiescent over the years. A major one of these technologies is the Internet or Web related distribution of documents. The Web or Internet, which had quietly existed for over a generation as a loose academic and government data distribution facility, reached "critical mass" and commenced a period of phenomenal expansion. With this expansion, businesses and consumers have direct access to all matter of documents and media through the Web. Also, as a result of the rapid expansion of the Web, E-mail, which has been distributed for over 25 years over smaller private and specific purpose networks, has moved into distribution over the Web because of the vast distribution channels that are available.

The availability of extensive E-mail distribution channels has made it possible to keep all necessary parties in business, government and public organizations completely informed of all transactions that they need to know about at almost nominal costs. Because of the ease of such communication, the numbers of frequent addressees communicated with by each sender of E-mail has greatly increased. Accordingly, most E-mail programs enable their users to use diminutive names such as nicknames or aliases to represent the address of a single addressee or a group of addressees, e.g. "Bob" used to represent "RobertQ.Lewis@WQXZ.com" or "GroupA" used to represent a group of three salesmen in the sender's organization who must receive any E-mail correspondence related to product changes. It is now common practice for almost every E-mail user to maintain an address book relating his list of aliases to the addresses of the addressees assigned such aliases. Address books are a primary target of the malevolent intruders who spread computer viruses. The address book is accessed and the virus is then sent to every address in the book.

SUMMARY OF THE PRESENT INVENTION

The present invention safeguards the E-mail sender's address book with only minimal interference with normal E-mail distribution from the sender. The present invention involves encryption of the user's address book, but we have found that complete encryption of the address book does create some interference with the send function in that before any E-mail function may be started, the address book must be accessed and decrypted even when the E-mail being sent does not involve the address book.

However, we have further found that the address book may be safeguarded from the computer virus with minimum E-mail interference if only a part of the address book is encrypted. Thus, the present invention involves the combination of means for storing unencrypted data representative of a plurality of aliases for plurality of addressees of electronic mail, means for separately storing encrypted data representative of the electronic mail addresses of said plurality of addressees, and means responsive to a request to send electronic mail to one of said aliases for requiring the entry of the key to decrypt the encrypted data to thereby provide the address of the addressee having said alias.

With this arrangement, means may be provided for initially prompting the sender of electronic mail to enter addressee data. Then, even before any decryption of the address book data is done, there are means for determining from said unencrypted alias list data whether said entered data includes one of said aliases. If the entered addressee data contains no alias, then the addresses are conventional full addresses, there is no decryption of the addressees and the E-mail is conventionally sent. The decryption is done only if an alias is entered for an addressee. The decryption key is, preferably, in the form of a password.

In accordance with a further aspect of this invention, we have found that in many E-mail systems, E-mail correspondence may be received from addressees for whom the receiving user has an alias for the addressee who sent the E-mail. Means may be provided for determining whether the mail is received from an alias name and, if so, to store such E-mail in encrypted form in order to protect such a frequently used addressee from being sent the computer virus.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
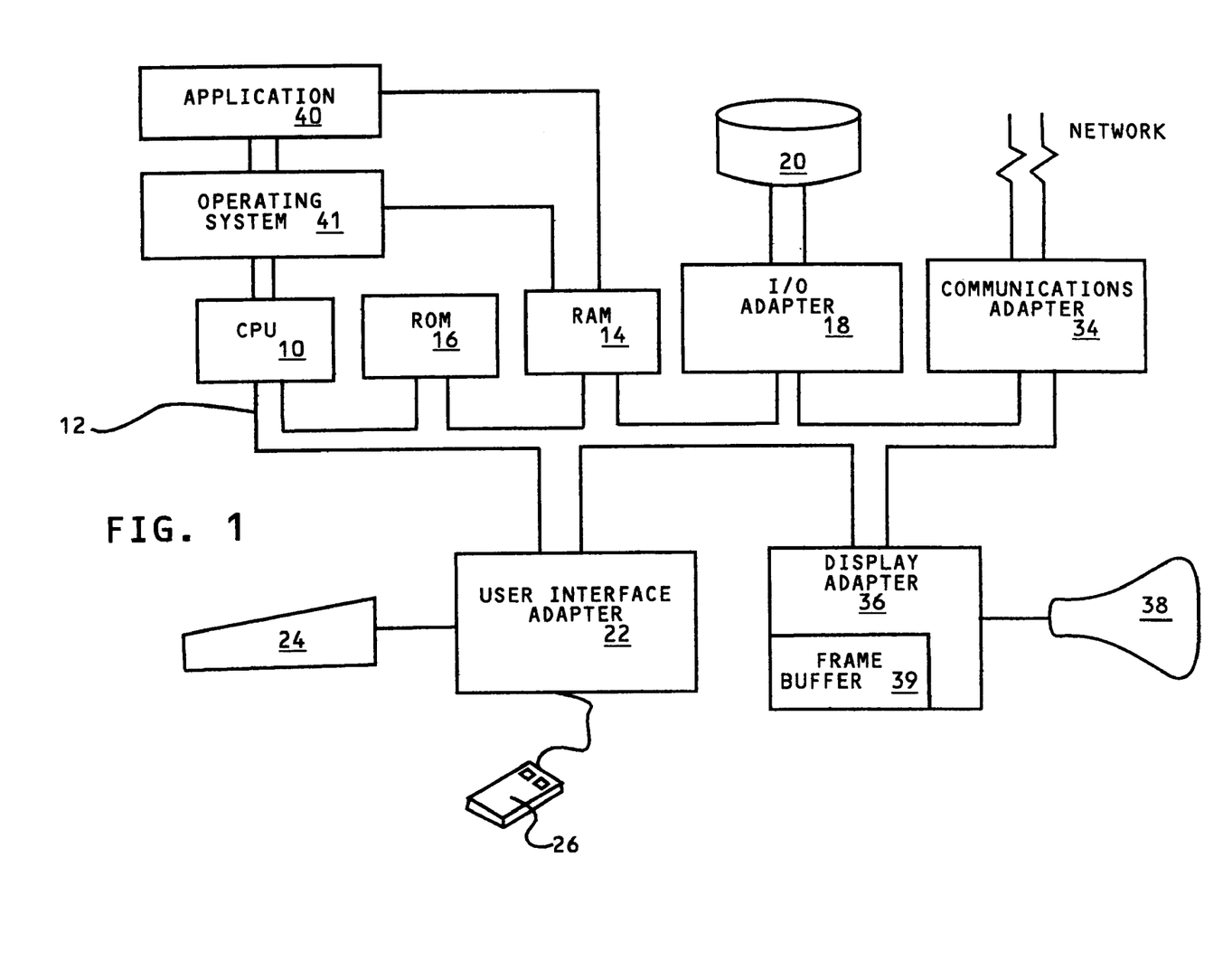
FIG. 1 is a block diagram of a data processing system including a central processing unit and network connections via a communications adapter that is capable of implementing the interactive display terminals, as well as servers in the Internet or Web E-mail distribution of this invention.
Figure 2:
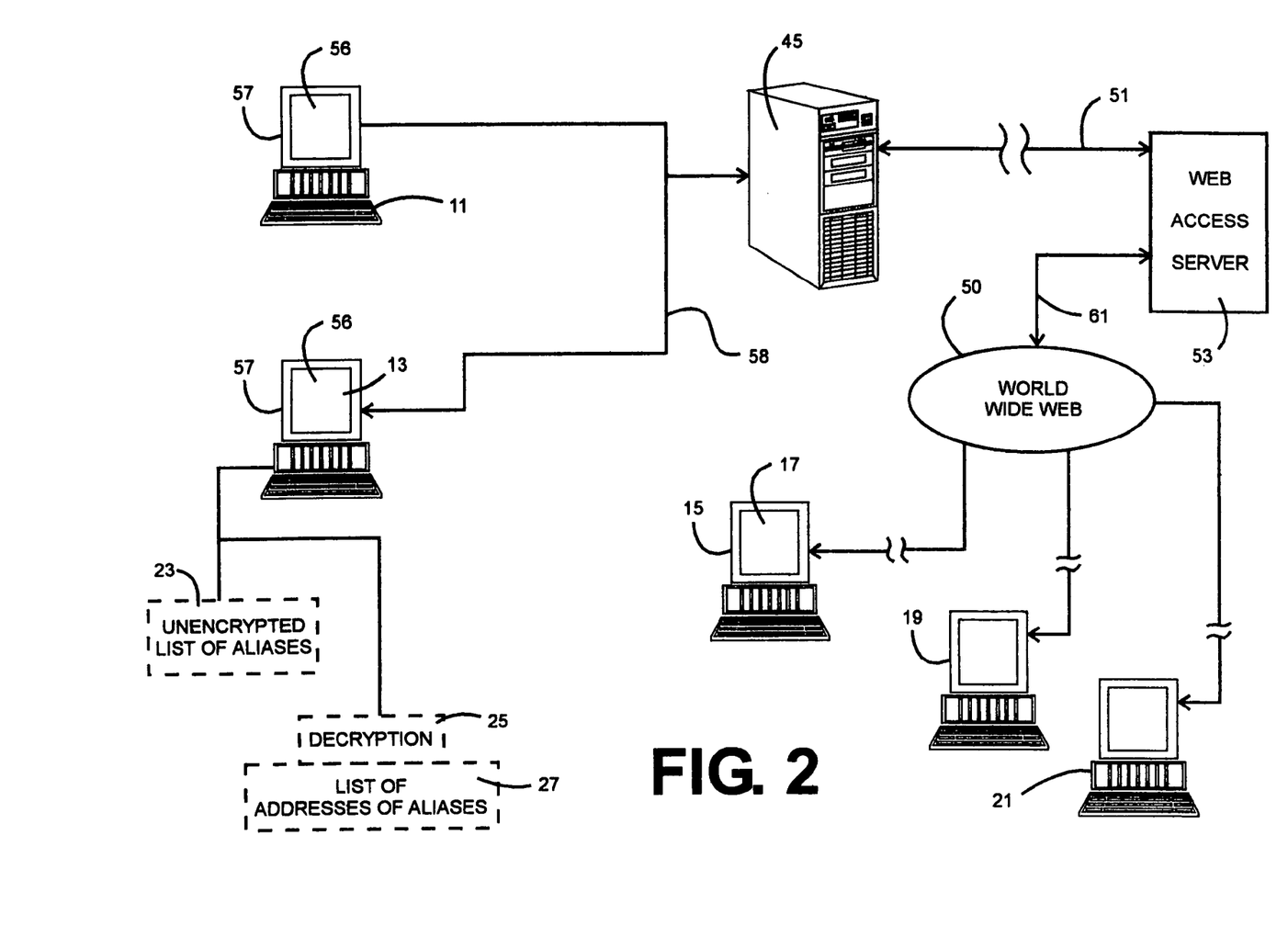
FIG. 2 is a generalized view of an E-mail distribution system in a Web or Internet that may be used in the practice of the present invention.

Referring to FIG. 1, a typical data processing system is shown which may function as the computer controlled network terminal or Web station used conventionally as any of the sending or receiving Web stations for electronic mail transmission; the system shown is also illustrative of any of the server computers used for the Web E-mail distribution to be described in greater detail with respect to FIG. 2.

A central processing unit (CPU) 10, may be one of the commercial microprocessors in personal computers available from International Business Machines Corporation (IBM) or Dell Corporation; when the system shown is used as a server computer at the Web distribution site, to be subsequently described, then a workstation is preferably used, e.g. RISC System/6000™ (RS/6000) series available from IBM. The CPU is interconnected to various other components by system bus 12. An operating system 41 runs on CPU 10, provides control and is used to coordinate the function of the various components of FIG. 1. Operating system 41 may be one of the commercially available operating systems such as the AIX 5L™ operating system available from IBM; Microsoft's Windows XP™ or Windows2000™, as well as UNIX and other AIX operating systems. Application programs 40, controlled by the system, are moved into and out of the main memory Random Access Memory (RAM) 14. These programs include the programs of the present invention for preventing computer viruses from accessing the sender's address book by encrypting the full addresses in the book while making the aliases available in unencrypted form for E-mail functions preliminary to the sending of E-mail. Where the computer system shown functions as the receiving Web station, then any conventional Web browser application program, such as the Microsoft's Internet Explorer™, will be available for accessing E-mail from the Web and for sending E-mail to the Web from the network station. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with the outside network enabling the computer system to communicate with other such computers over the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user at a receiving station may interactively relate to the Web in order to access Web documents. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods that may be related to the present invention. Since a major aspect of the present invention is directed to E-mail documents transmitted over networks, an understanding of networks and their operating principles would be helpful. We will not go into great detail in describing the networks to which the present invention is applicable. Reference has also been made to the applicability of the present invention to a global network, such as the Internet or Web. For details on Internet nodes, objects and links, reference is made to the text, *Mastering the Internet*, G. H. Cady et al., published by Sybex Inc., Alameda, Calif., 1996. The Internet or Web is a global network of a heterogeneous mix of computer technologies and operating systems. Higher level objects are linked to the lower level objects in the hierarchy through a variety of network server computers. E-mail is distributed through such a network.

A generalized diagram of a portion of the Web for illustration of the E-mail distribution system of the present invention is shown in FIG. 2. The computer controlled display terminals 11 and 13 have displays 57 upon which E-mail documents 56 may be created by senders and displayed. Terminals 11 and 15 may be implemented by the computer system set up in FIG. 1, and connection 58 (FIG. 2) is the network connection shown in FIG. 1. For purposes of the present embodiment, terminals 11 and 13 serve as a Web display station for the sending of E-mail via the display interfaces to be described with respect to FIGS. 3 through 6 via Web browser programs. Reference may be made to the above-mentioned *Mastering the Internet*, pp. 136–147, for typical connections between local display stations to the Web via network servers, any of which may be used to implement the system on which this invention is used. In the typical set up shown, terminals are connected via, let us say, host dial connections (not shown) to server 45 provided by a Web Service Provider that in turn accesses the Web 50 via connection 51 to a Web access server 53 and connection 61. For the purpose of this embodiment, E-mail is created on either terminal 11 or 13, and sent over the Web 50 to receiving terminals 15, 19 or 21. A key to the invention is the separate storage at the sending terminal of the alias portions and full E-mail address portions of the sender's address book. This is illustrated on terminal 13 wherein the list of unencrypted aliases are stored 23 separately, e.g. in the form of a folder, while the list of the respective alias addressees is stored 27 separately, also preferably in the form of a folder, but in encrypted form. Note that the alias list and the encrypted addresses may be stored separately on the disk storage device 20 in FIG. 1 until needed. Appropriate decryption means 25 will decrypt addresses from list 27 if the appropriate key or password is presented as will now be described with respect to the illustrated E-mail interfaces of FIGS. 3 through 5.

Figure 3:
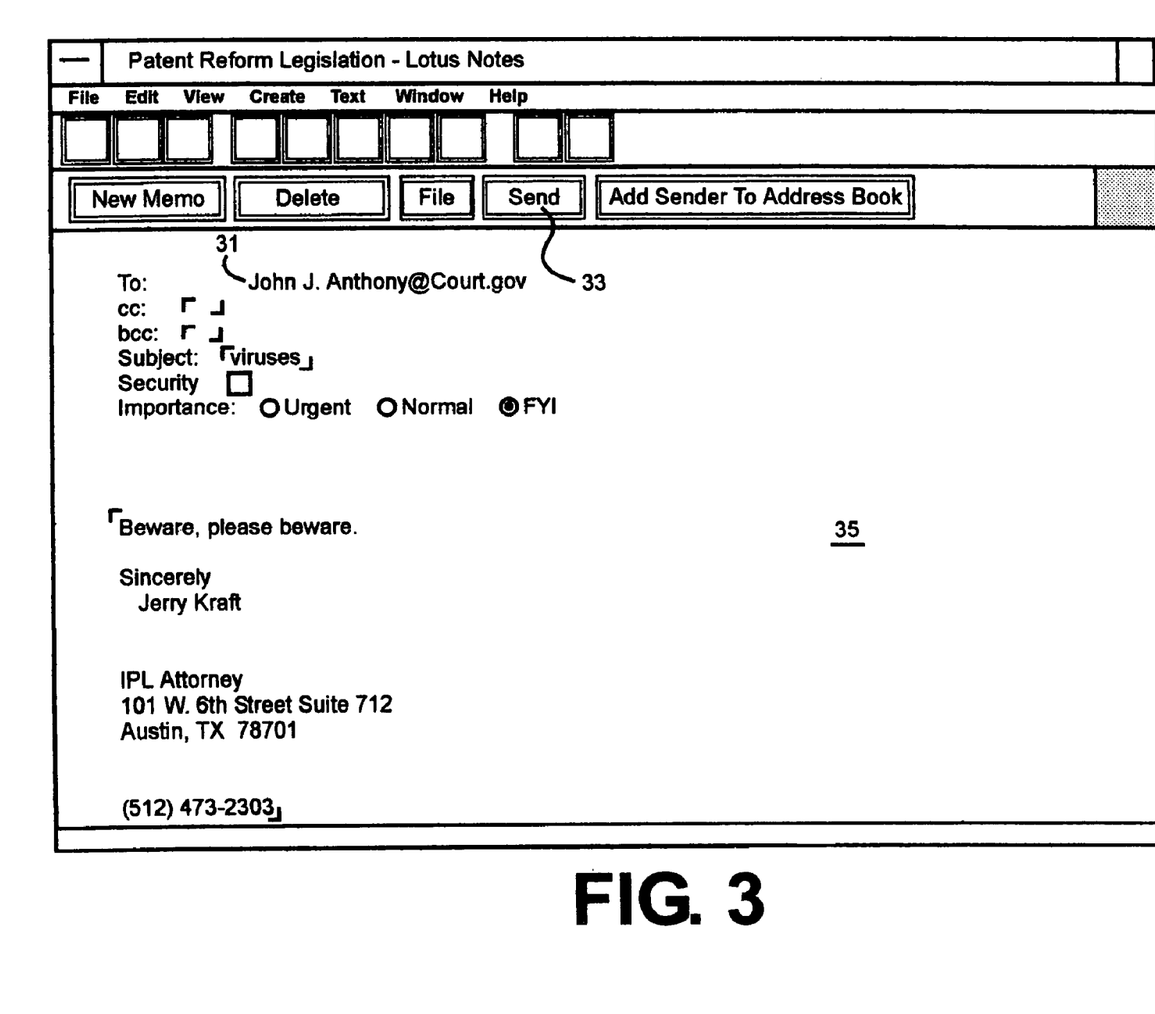
FIG. 3 is a diagrammatic illustration of an interactive display interface used for the writing of an E-mail document where the entered addressee is not an alias but a full conventional address.

In FIG. 3 there is illustrated an E-mail document or letter 35 being created by a sender as shown in FIG. 2, e.g. E-mail 56 on sending terminals 13. The sender writes the message and enters the address 31 of the addressee. When the sender clicks on the send button 33, a determination is made as to whether the sender has entered one of the aliases separately stored 23. Since these aliases are unencrypted, no decryption or the entry of a decryption key is required. Whereas in the illustration of FIG. 3, the address is an actual address and not an alias, the E-mail document is sent when the sender clicks on "send" 33. In this illustration, there is only a single addressee. Where there are multiple addressees or a set of addressees to be copied, this checking as to whether an alias has been entered is determined for each entry of an addressee. Then, if any entry of an alias is found, as is the case in FIG. 4 where the entered name, "John", is determined to be an alias, upon the clicking on the send button 33, a dialog box 37 appears, FIG. 5, which prompts the sender to enter 43 an appropriate password or key. The proper key decrypts the address of the alias addressee and the E-mail document or message is sent. The encrypted separately stored list of addresses protects the address book of the sender against the intruders' viruses. If the computer virus attempts to get the address book so as to send the infecting virus to the addressees, at most, the virus will only be able to access the unencrypted list of aliases. These will be of no value as the intruder will be unable to access the encrypted address list. On the other hand, the sender is not required to have the address book decrypted when he is sending to addresses without aliases or otherwise using complete addressing. Also, the system may still do a portion of the preliminary work with aliases before decryption must take place.

The encryption system may be any encryption system conventionally used for Web or E-mail documents. Encryption in the Internet or Web is discussed in greater detail in the text: *Internet: The Complete Reference Millennium Edition*, Young et al., Osborne/McGraw-Hill, Berkeley, 1999, particularly pp. 403–406. Web transactions are primarily encrypted using Public Key Cryptology, a system in which pairs of very large numbers are used to encode and decode transmitted data. One number of the pair is called the public key and is published, while the second number, the private key, is kept secret. Thus, when data is encoded using the public key, then the holder of the private key can decode or decrypt it. Conversely, the holder of the private key can prove its identity by encoding a message using that key. Then anyone who receives that message may decrypt the message by using the public key; since such a decryption that produces a coherent message proves that the sender is the holder of the private key. The strength of a public key system is measured by the size of the numbers used as keys. The two currently used Web sizes are 40 to 64 bits for lighter encryption and 128 bits for heavier encryption. Each added bit approximately doubles the difficulty of breaking the code. Thus, 128 bit encryption is about a trillion times more difficult to break than 40 bit encryption. The standard encryption protocol for Web Documents is the Secure Sockets Layer (SSL). SSL encrypts the whole Web document, uses Digital Certificates issued by a certifying authority that has been approved under SSL protocols to authenticate that respective Web servers are what they claim to be and then the Web server and the Web station browser send encrypted messages back and forth until the particular transaction is complete.

In order to completely protect the addresses of the aliases, it is important to isolate the aliases from their corresponding full addresses. Thus, it may be the case that even alias E-mail, the address of which has been properly decrypted, may connect the alias with the address in the E-mail document itself. In such a case, the E-mail note itself should be stored in an encrypted folder. Alternatively, an incoming received E-mail from a frequent address that has an alias may be set up or stored in such a manner that the alias and address may be connected. In such a case, the received E-mail should be stored in encrypted form.

Figure 6:
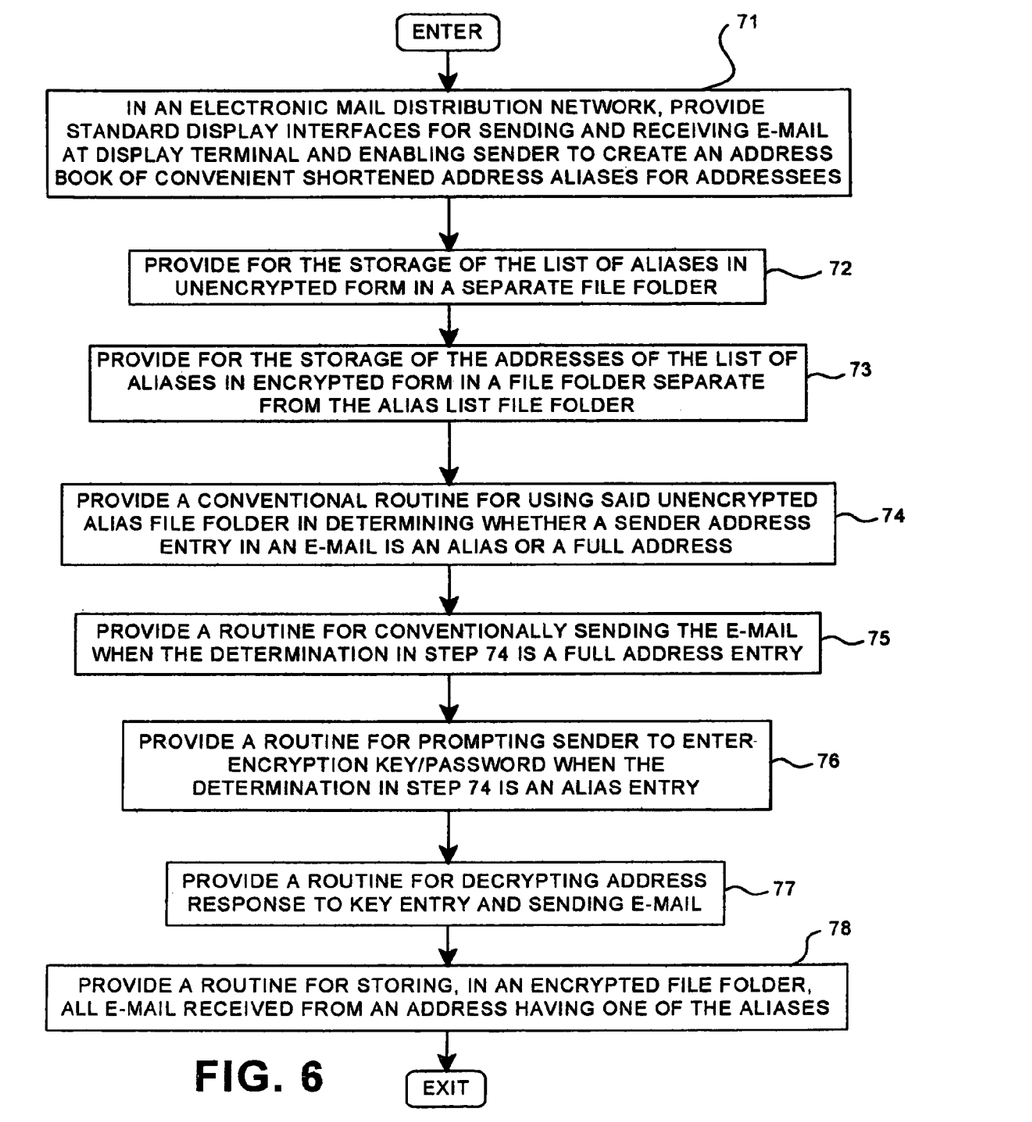
FIG. 6 is an illustrative flowchart describing the setting up of the functions to protect the sender address book in accordance with the present invention.

FIG. 6 is a flowchart showing the development of a process according to the present invention for enabling senders of electronic mail to prevent computer viruses from accessing a sender's address book with a minimum of inconvenience to routine E-mail sending procedures. In any standard E-mail network system, enabling senders at display terminals to distribute E-mail to specified users, step 71 (reference may be made to such a distribution network as described in the text, *The ABCs of Lotus Notes* 4.5, R. Clayton, published by SYBEX Inc., San Francisco, 1997, particularly Chapter 18, pp. 367–398), there is also provided at the sender's display terminal, step 72, an implementation for storing the list of addressee aliases from the sender's address book in unencrypted form in a separate file folder. There is also provision for the storage of the addresses for the list of aliases in an encrypted file folder separate from the alias list file folder, step 73. Standard E-mail sending routines are provided for using the unencrypted alias list file folder data to determine whether a sender entry of an addressee in the E-mail message or document is a full address or an alias, step 74. A routine is provided responsive to a determination in step 74 to conventionally send the E-mail document when that entry ia a full address, step 75. However, when the determination in step 74 is that the entry is an alias, then a routine is provided to prompt the sender to enter the appropriate key or password, step 76. Response to a correct password/key, a routine is provided for decrypting the corresponding address and sending the E-mail, step 77. Finally, an implementation is provided for storing in an encrypted file folder, any E-mail received by the sender from an address that has been sent to frequently enough for the user to have designated an alias for it. In handling of such received E-mail, it is likely that the E-mail protocols may link the address of the received E-mail to its alias. Otherwise, the computer virus intruder may work backwards to link the alias to its encrypted address, and thereby gain access to a portion of the address book. Similarly, caution is advised in considering whether, after the decryption and sending of E-mail to the address corresponding to an alias, the actual sent E-mail document may link the alias to the address. If this is possible, then the sent E-mail should be stored in encrypted form.

Figure 4:
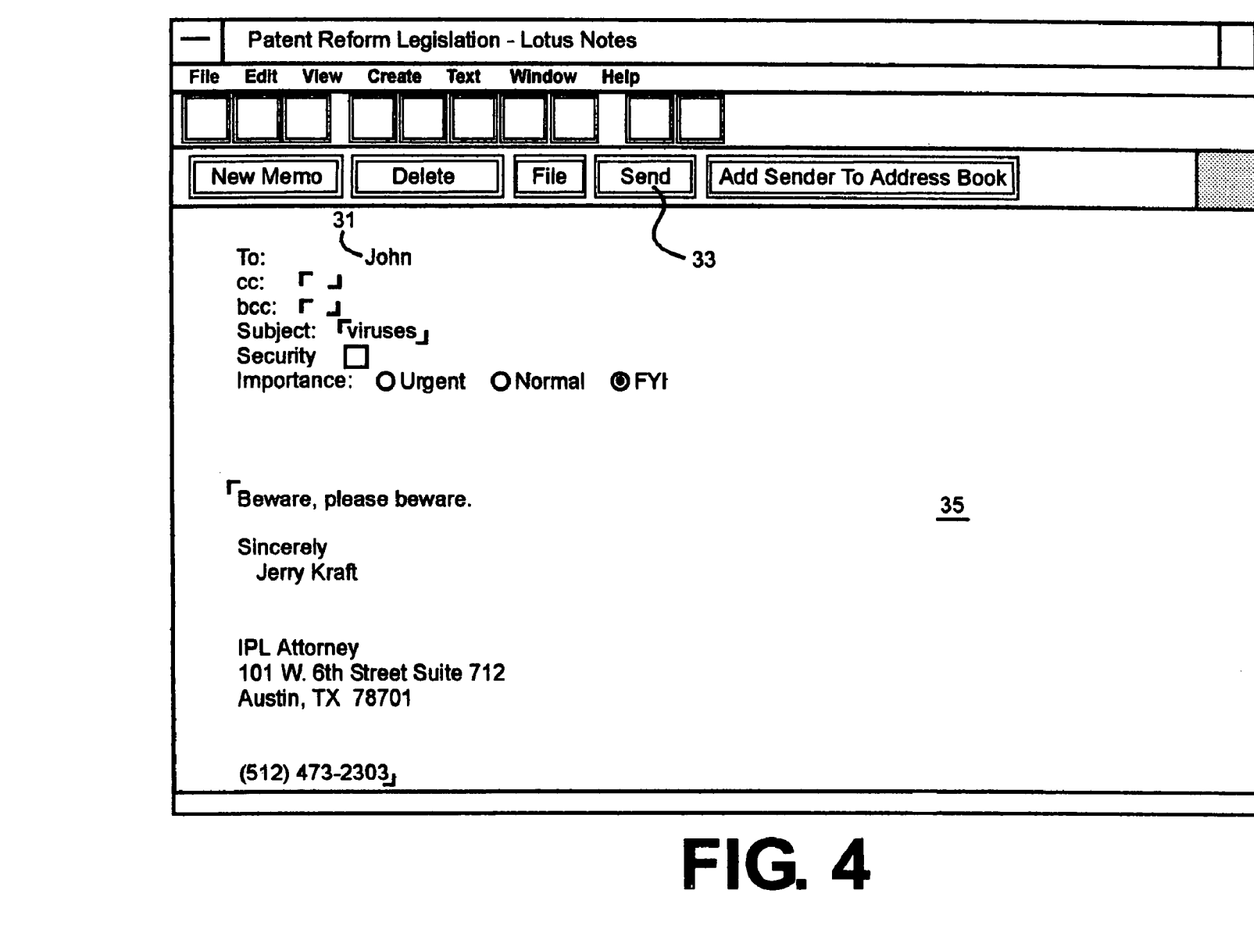
FIG. 4 is the display interface like that of FIG. 3 but where the entered addressee is a recognized alias.
Figure 5:
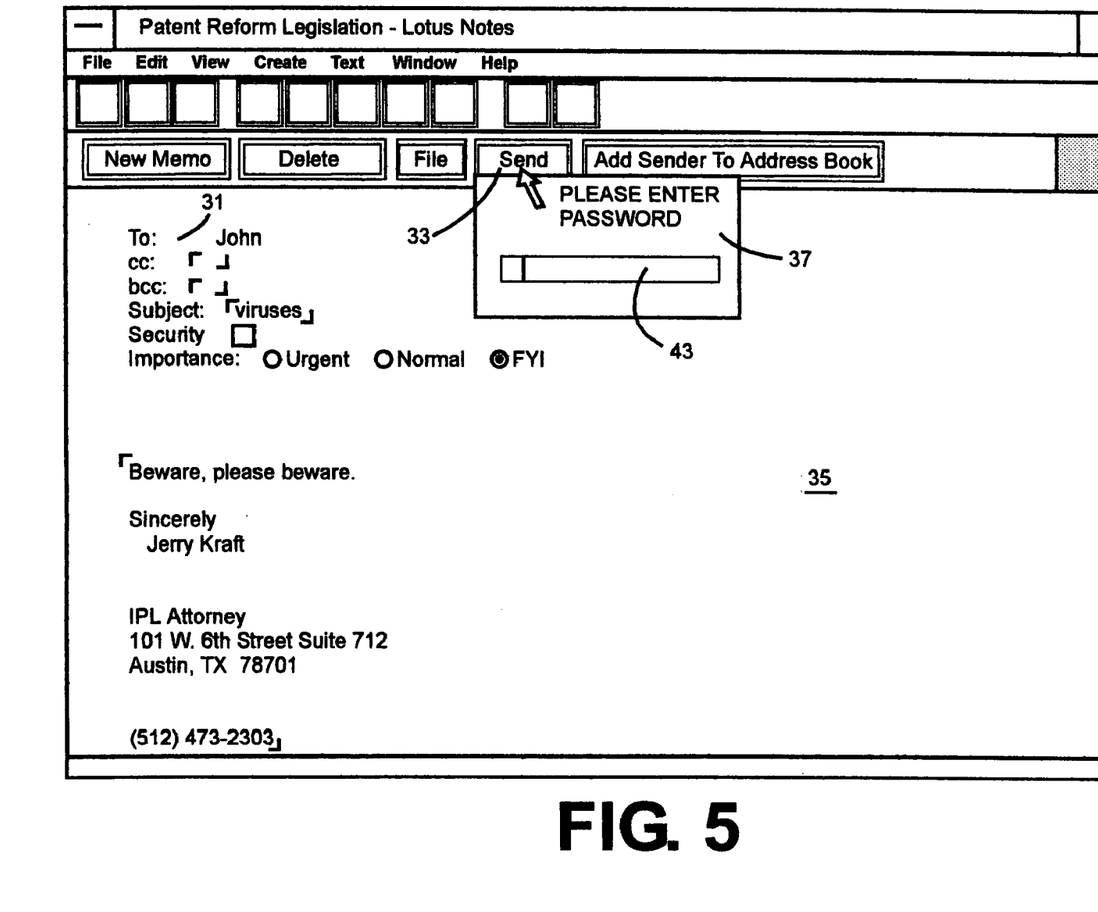
FIG. 5 is the display interface of FIG. 4 after the sender has clicked on the send button.
Figure 7:
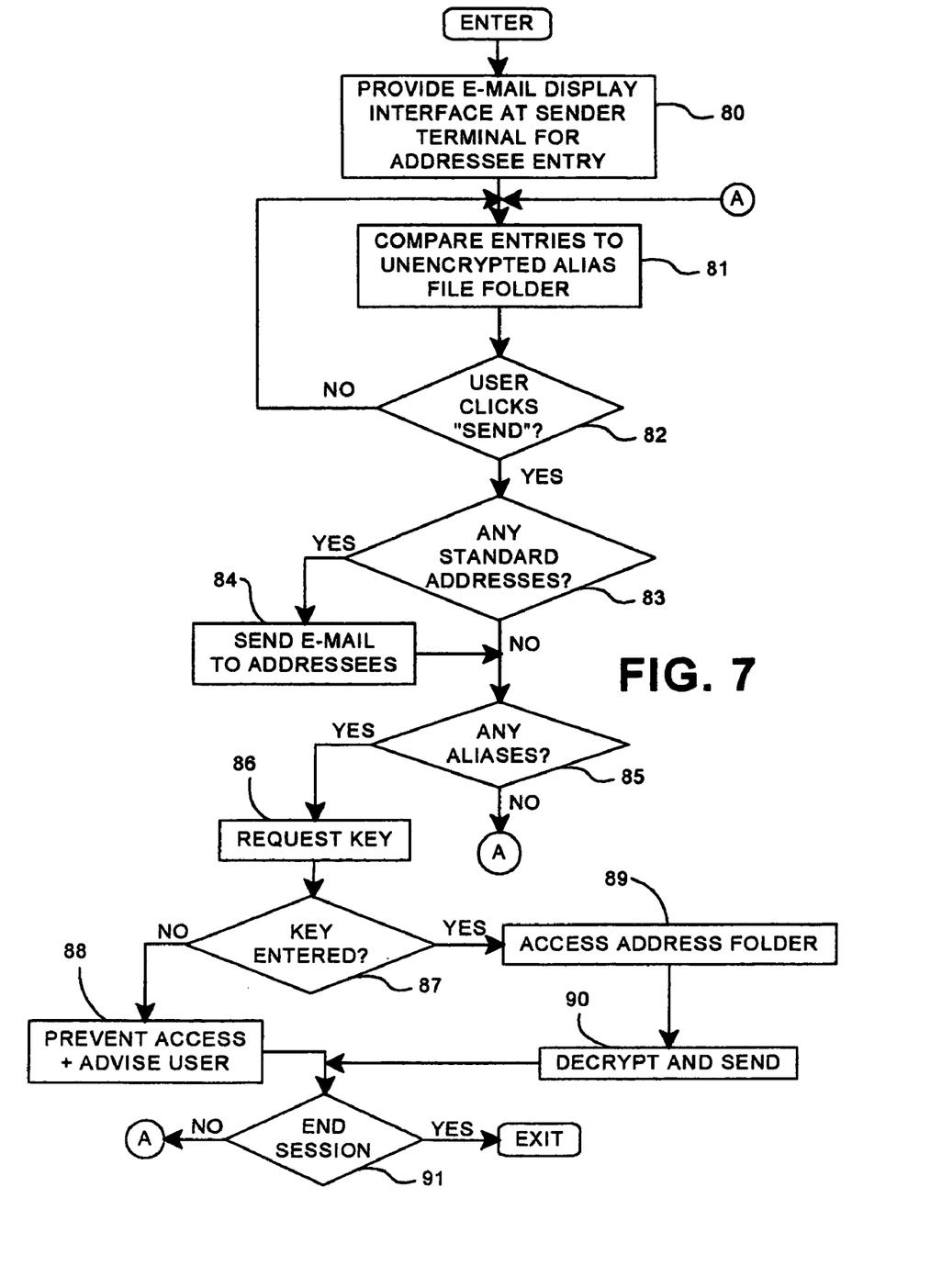
FIG. 7 is a flowchart of an illustrative run of the program set up according to FIG. 6.

A simplified run of the process set up in FIG. 6 and described in connection with FIGS. 3 through 5 will now be described with respect to the flowchart of FIG. 7. At the display terminal of the E-mail sender there is provided an interface enabling the sender to enter addressees, step 80. The address entries are compared to the list of aliases in the unencrypted alias file folder, step 81. A determination is then made as to whether the sender has clicked on the "Send" button, step 82. If No, the process is returned to step 81 where other addressee entries may be compared for aliases while the "Send" click is awaited. If Yes, then a determination is made as to whether the address entered is a standard full address, step 83. If Yes, then the E-mail document is routinely sent to the entered address, step 84. If No, then a further determination is made, step 85, as to whether the entry compares to one of the aliases. Also, even after step 84, the determination of step 85 is made as to whether any additional addressee entries are aliases. If the determination from step 85 is Yes, then the sender is requested to enter the decryption key, e.g. a password, step 86. If the determination in step 87 is Yes, the key entered is correct, access to the address file folder is permitted, step 89, the alias address is decrypted to a full address and the E-mail sent to that address, step 90. If the determination from step 87 is No, the key was not correct, then access is denied, and the sender is so advised via the display, step 88. In either case a determination is now conveniently made, step 91, as to whether the E-mail sending session is over. If Yes, it is exited; if No, the process is returned to step 81 via branch "A" so that other address entries on subsequent E-mail documents may be similarly processed. Also, if the decision from previous step 85 is No, there are not any further alias entries in the current E-mail, then the process is also returned to step 81 via branch "A" so that other address entries on subsequent E-mail documents may be similarly processed.

One of the preferred implementations of the present invention is in application program 40 made up of programming steps or instructions resident in RAM 14, FIG. 1, of Web server computers during various Web operations. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a communication network for electronic mail distribution between data processor controlled interactive display terminals, a sending terminal comprising:

means for storing unencrypted data representative of a plurality of aliases for a plurality of addressees of electronic mail;

means for separately storing encrypted data representative of electronic mail addresses of said plurality of addressees;

means for prompting a sender of electronic mail to enter addressee data;

means for determining from said unencrypted data whether said entered addressee data includes one of said aliases; and means for requiring entry of a key to decrypt the encrypted data to thereby provide the address of the addressee having said alias, responsive to a determination that said entered addressee data includes one of said aliases.

2. The electronic mail distribution network of claim 1 wherein at least one of said aliases is for a set of addressees.

3. The electronic mail distribution network of claim 1 further including means, responsive to a request to send electronic mail to an addressee other than one having a stored alias, for sending electronic mail without requiring the entry of said key.

4. The electronic mail distribution network of claim 1 wherein said key to decrypt is the entry of a password.

5. The electronic mail distribution network of claim 1 wherein:

said means for storing said unencrypted data representative of said aliases is an unencrypted file folder; and said means for separately storing said encrypted data representative of said electronic nail addresses is a separate file folder.

6. The electronic mail distribution network of claim 1 further including means for encrypted storing of received electronic mail addressed to an address having one of said aliases.

7. The electronic mail distribution network of claim 5 further including means for encrypted storing in a file folder of received electronic mail addressed to an address having one of said aliases.

8. A method for preventing a computer virus from infecting a user's address book at a sending terminal in a communication network for electronic mail distribution between data processor controlled interactive display terminals comprising:

storing, at said sending terminal, unencrypted data representative of a plurality of aliases for a plurality of addressees of electronic mail;

separately storing, at said sending terminal, encrypted data representative of electronic mail addresses of said plurality of addressees;

prompting a sender of electronic mail to enter addressee data; determining from said unencrypted data whether said entered addressee data includes one of said aliases; and requiring entry of a key to decrypt the encrypted data to thereby provide the address of the addressee having said alias, responsive to a determination that said entered addressee data includes one of said aliases.

9. The electronic mail distribution method of claim 8 wherein at least one of said aliases is for a set of addressees.

10. The electronic mail distribution method of claim 8 further including the step, responsive to a request to send electronic mail to an addressee other than one having a stored alias, of sending electronic mail without requiring the entry of said key.

11. The electronic mail distribution method of claim 8 wherein said key to decrypt is the entry of a password.

12. The electronic mail distribution method of claim 8 wherein:

said storing of said unencrypted data representative of said aliases is in an unencrypted file folder; and said separate storing of said encrypted data representative of said electronic mail addresses is in a separate file folder.

13. The electronic mail distribution method of claim 8 further including the step of storing, in encrypted form, received electronic mail addressed to an address having one of said aliases.

14. The electronic mail distribution method of claim 12 further including the step of encrypted storing in a file folder of received electronic mail addressed to an address having one of said aliases.

15. A computer program having code recorded on a computer readable medium for preventing a computer virus from infecting a user'address book at a sending terminal in a communication network for electronic mail distribution between data processor controlled interactive display terminals comprising:

means for storing unencrypted data representative of a plurality of aliases for a plurality of addressees of electronic mail;

means for separately storing encrypted data representative of electronic mail addresses of said plurality of addressees;

means for prompting a sender of electronic mail to enter addressee data;

means for determining from said unencrypted data whether said entered addressee data includes one of said aliases; and means for requiring entry of a key to decrypt the encrypted data to thereby provide the address of the addressee having said alias, responsive to a determination that said entered addressee data includes one of said aliases.

16. The computer program of claim 15 wherein at least one of said aliases is for a set of addressees.

17. The computer program of claim 15 further including means, responsive to a request to send electronic mail to an addressee other than one having a stored alias, for sending electronic mail without requiring the entry of said key.

18. The computer program of claim 15 wherein said key to decrypt is the entry of a password.

19. The computer program of claim 15 wherein:
said means for storing said unencrypted data representative of said aliases is an unencrypted file folder; and
said means for separately storing said encrypted data representative of said electronic mail addresses is a separate file folder.

20. The computer program of claim 15 further including means for encrypted storing of received electronic mail addressed to an address having one of said aliases.

21. The computer program of claim 19 further including means for encrypted storing in a file folder of received electronic mail addressed to an address having one of said aliases.

22. In a communication network for electronic mail distribution between data processor controlled interactive display terminals, a sending terminal comprising:
a first storage unit storing unencrypted data representative of a plurality of aliases for a plurality of addressees of electronic mail;
a second storage unit separate from said first storage unit for storing encrypted data representative of electronic mail addresses of said plurality of addressees;
a security implement for prohibiting access to said encrypted data in said second storage unit without a entry of a security key;
an on-screen display terminal implementation prompting a sender of electronic mail to enter addressee data; and
an implement for determining from said unencrypted data whether said entered addressee data includes one of said aliases and
an on-screen sending terminal display implementation for requiring the entry of said security key to decrypt the encrypted data to thereby provide the address of the addressee having said alias, responsive to a determination that said entered addressee data includes one of said aliases.

23. The electronic mail distribution network of claim 22 further including an implement, responsive to a request to send electronic mail to an addressee other than one having a stored alias, for sending electronic mail without requiring the entry of said key.

24. The electronic mail distribution network of claim 23 wherein said key to decrypt is the entry of a password.

\* \* \* \* \*